United States Patent [19]

Kozachevsky et al.

[11] Patent Number: 4,984,976

[45] Date of Patent: Jan. 15, 1991

[54] MOLD FOR MAKING ANNULAR POLYMERIC ARTICLES

[76] Inventors: Gennady G. Kozachevsky, ul. Yakubovskogo, 18, k. 2, kv. 271; Vladimir P. Boikov, ul. Ya. Kolasa, 139, kv. 172; Valery V. Guskov, ulitsa Kulman, 13, kv. 19; Oleg I. Molodan, ulitsa Slavinskogo, 15, kv. 63; Svetlana I. Sizova, ulitsa Ya. Kolasa, 139, kv. 172, all of Minsk; Jury N. Gorodnichev, ulitsa Gertsena, 37, korpus 1, kv. 72, Moscow, all of U.S.S.R.

[21] Appl. No.: 134,778

[22] PCT Filed: Feb. 27, 1986

[86] PCT No.: PCT/SU86/00018

§ 371 Date: Oct. 26, 1987

§ 102(e) Date: Oct. 26, 1987

[87] PCT Pub. No.: WO87/05257

PCT Pub. Date: Sep. 11, 1987

[51] Int. Cl.$^5$ .................... B29C 35/02; B29C 33/26; B29D 29/08
[52] U.S. Cl. ....................... 425/35; 264/296; 264/326; 264/DIG. 67; 425/28.1; 425/47; 425/49; 425/393; 425/441; 425/446; 425/451.5; 425/451.9
[58] Field of Search ....... 264/296, 325, 326, DIG. 67; 425/28 B, 35, 47, 49, 384, 392–396, 399, 412, 423, 441, 446, 451–455, 457–459, 28.1

[56] References Cited

U.S. PATENT DOCUMENTS 2,381,395 8/1945 Brown .................................. 264/325
3,989,439 11/1976 Schmitzberger .................... 264/296

FOREIGN PATENT DOCUMENTS 195088 6/1967 U.S.S.R. .
330983 4/1972 U.S.S.R. .
1286068 8/1972 United Kingdom .
1292929 10/1972 United Kingdom .

Primary Examiner—Jan H. Silbaugh
Assistant Examiner—Mathieu Vargot
Attorney, Agent, or Firm—Lilling & Greenspan

[57] ABSTRACT

A method of making annular polymeric articles in which a workpiece is placed on a cylindrical shaping surface and is divided about the perimeter into alternating first and second portions. Moulding is done in two stages, the first stage including moulding the first portions, and the second stage including moulding the second portions interposed between the first portions at the same time maintaining the pressure exerted on the first portion, after which the workpiece is vulcanized. The mould includes a cylindrical core (1) having a shaped surface, mounted on a base and serving to accommodate the workpiece thereon, and elements (5, 6) for squeezing the workpiece arranged around the cylindrical core (1) alternately, the first elements (5) having each side surfaces (7) parallel with the axis of symmetry of this element (5), whereas the second elements (6) having each side surfaces (7) of the neighboring first elements (5) arranged at an angle (α) to the axis of symmetry of this element (6), the kinematic linkage of the first and second elements (5 and 6) with the device for moving them in the radial direction being adapted for a successive movement initially of all the second elements (6) and then all the first elements (5).

4 Claims, 2 Drawing Sheets

MOLD FOR MAKING ANNULAR POLYMERIC ARTICLES

BACKGROUND OF THE INVENTION

1. Field of the Invention

This invention relates generally to fabricating annular polymeric articles, and more particularly to a method of making annular polymeric articles and moulds for carrying out the method.

2. Description of the Prior Art

Known in the art are methods of making annular polymeric articles in which a workpiece is placed on a shaping cylindrical surface, after which the workpiece is squeezed on this surface and vulcanized. Squeezing is done by sector elements arranged around the cylindrical shaping surface by moving the sectors radially.

There are also known moulds for making annular polymeric articles comprising a cylindrical core (cylindrical shaping surface) serving to accommodate thereon elements of the article. Arranged around the cylindrical core are sectors for squeezing the workpiece kinematically linked with a drive for moving these sectors radially to form a closed circuit. For avoiding unproductive losses the outer sides of the sectors at their abutments are provided with recesses accommodating locks to prevent leaks of elastic material (SU, A, 195,088).

The aforedescribed devices can be used, however, only for making one-sided toothed belts, because in the course of moulding the elastic material is at first forced to the clearance between the sectors to gradually flow then to the molding interior as the clearance diminishes accompanied by the formation of fins in the zone of abutment. When making polymeric articles having a wear-resistant fabric lining at the outer surface, such as double-sided toothed belts, the fabric lining between the sectors is subject to biting or cutting. Due to the flow of the elastic material to the clearance between the sectors and then due to the backflow of the elastic material to the molding zone insufficient moulding takes place in the abutment zone, especially during fabrication of shaped articles.

SUMMARY OF THE INVENTION

The invention aims at providing a method and a mould for making annular polymeric articles in which the moulding process would be so carried out as to ensure fabrication of both single-sided and double-sided toothed belts with wear-resistant tooth lining of a higher quality.

The aims of the invention are attained by a method of making polymeric articles, in which a workpiece is placed on a cylindrical shaping surface, after which it is moulded by squeezing it on this shaping surface and is vulcanized. According to the invention, the surface of the workpiece is divided about the perimeter into alternating first and second portions, and moulding is done in two stages, the first stage including moulding the first portions, whereas the second stage includes moulding the second portions interposed between the first portions at the same time maintaining the pressure applied to the first portions.

A mould for carrying out the method comprises a cylindrical core having a shaped surface, mounted on a base and serving to accommodate the workpiece thereon, and elements for squeezing the workpiece arranged around the cylindrical core and kinematically linked with a means for moving these elements radially to the formation of a closed circuit, in which mould. According to the invention, the elements are arranged around the cylindrical core alternately, each first element having side surfaces parallel with the axis of symmetry of this element, whereas each second element has side surfaces adjacent to the side surfaces of the neighbouring first elements arranged at an angle to the axis of symmetry of this element, the kinematic linkage between the first and second elements and the means for moving them in the radial direction being adapted for a successive movement initially of all the second elements and then all the first elements.

Preferably, the mould has two first elements and two second elements, the side surfaces of each second element resting at an angle of $\alpha = 90°$ to the axis of symmetry thereof.

Such an arrangement of the mould is structurally simple, and is especially adaptable to making belts of small size.

Favourably, the kinematic linkage for executing successive radial movements of the first and second elements is ensured by a shell arranged coaxially relative to the core, capable of axial displacement, and carrying on its inner side resiliently secured wedges, and arms with pivot axes secured on the base and each engageable with the corresponding wedge and element in the course of movement of the shell, the wedges acting on the first elements and wedges acting on the second elements being secured on the shell with a difference in terms of the height of their arrangement.

This kinematic linkage is structurally simple and allows to make use of the translational movement of press plates.

The method of making annular polymeric articles and the mould for carrying out the method make it possible to fabricate both single-sided and double-sided toothed belts with a fabric lining of the teeth of a relatively high quality.

BRIEF DESCRIPTION OF THE DRAWINGS

The invention will now be described in greater detail with reference to preferred embodiments thereof taken in conjunction with the accompanying drawings, in which.

DESCRIPTION OF THE PREFERRED EMBODIMENT

Figure 1:
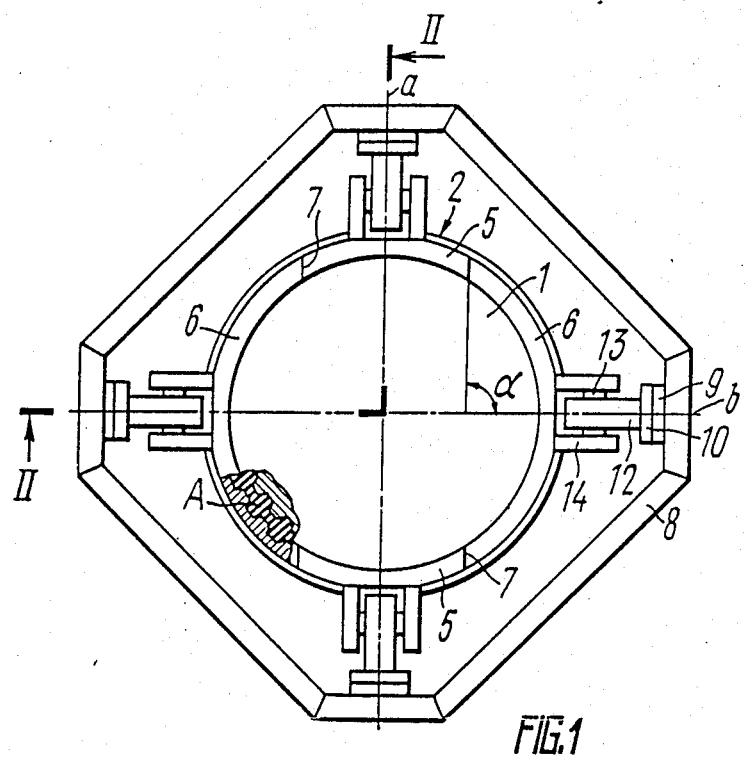
FIG. 1 is a top plan partially cut-away view of a mould for making polymeric articles according to the invention.

A method of making annular polymeric articles, in which a workpiece "A" (FIG. 1) includes a carrying element, an elastic material, and a wear-resistant fabric lining is placed on a cylindrical shaping surface (cylindrical core 1 having a shaped surface), after which the surface of the workpiece "A" is divided about the perimeter into alternating first and second portions to be followed by moulding. Moulding is done in two stages. Initially, the first portions are moulded, and then at the second stage the second portions interposed between the first are moulded while simultaneously retaining the pressure exerted on the first portions.

The essence of the proposed method will become more fully apparent from a detailed description of the preferred embodiment of the mould with reference to its operation.

Figure 2:
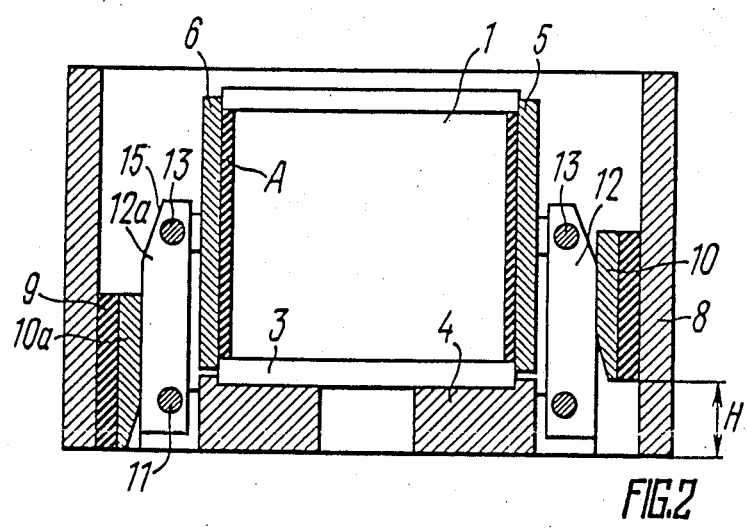
FIG. 2 is a section taken along the line II—II in FIG. 1.

The mould for making annular polymeric articles, such as double-sided toothed belts, includes a cylindrical core 1 (FIGS. 1, 2) hereinafter referred to as the core 1, and a mechanism 2 for squeezing the workpiece.

The core 1 has a shaped surface serving to accommodate the workpiece "A", and flanges 3 arranged at its end faces and projecting by their outer edges away from the core 1. The core 1 is mounted on a base 4. The mechanism 2 for squeezing the workpiece "A" includes elements 5, 6 arranged alternately around the core 1, and a kinematic chain linking them with a drive (not shown) for imparting movement thereto. Each element 5 has side surfaces 7 parallel with the axis "a" of symmetry of this element 5. The elements 6 have side surfaces adjacent to the side surfaces of the neighbouring element 5 at an angle of 90° to the axis "b" of symmetry of the element 6.

In the embodiment described herein there are two elements 5 and two elements 6, and therefore the side surfaces of the element 6 rest at an angle $\alpha=90°$ to the axis "b" of symmetry of the element 6. With any other number of the elements this angle will vary depending on their quantity.

The kinematic chain includes a shell 8 (FIG. 2) arranged around the core 1 and capable of axial displacement to execute alternate movement at first of all the elements 6 and then all the elements 5. Wedges 10, 10a are secured on the inner side of the shell 8 through a rubber spacer 9. Secured at the base 4 are pivot pins 11 of arms 12, 12a. Each arm 12 is connected by its other end through the pin 13 with the element 5, whereas the arm 12a is connected in a likewise manner with the element 6.

The arms 12, 12a are provided in the zones of their connection to the elements 5 or 6, respectively, with tapered surfaces 15 engageable, accordingly, with the wedges 10, 10a.

The wedges 10 and 10a engageable with the respective arms 12 and 12a secured on the shell 8 at different height. The distance "H" between the wedges 10 and 10a in terms of the height of arrangement is so selected that the first elements 5 execute their radial displacement after the second elements 6 have terminated their respective radial displacement.

The proposed mould for making annular polymeric articles operates in the following manner.

Elements of the workpiece "A" are placed on the core 1. Then the core 1 is mounted on the base 4 usually disposed at the lower plate of a press (not shown), where it is centered in the lower flange 3. The top plate (not shown) of the press with the shell secured thereto is then lowered. The shell 8 acts through the rubber spacers 9 and wedges 10a on the tapered surface 15 of the arms 12a. The arms 12a turn to move the squeezing elements 6 until they are in abutment with the flanges 3 of the core 1. Because the squeezing elements 5, 6 are arranged on the arms 12, 12a through pins 13, the elements 5, 6 are caused to move strictly radially in contrast to the arms 12, 12a movable about a radius relative to the pin 11.

Thanks to that the wedges 10a disposed in front of the second squeezing elements 6 are secured on the shell 8 at the distance "H" below the wedges resting in front of the first squeezing elements 5, the elements 6 are first caused to move radially followed by the radial movement of the elements 5. The elements 6 move to the stop against the flanges 3 to mould the first portions of the workpiece "A".

Figure 3:
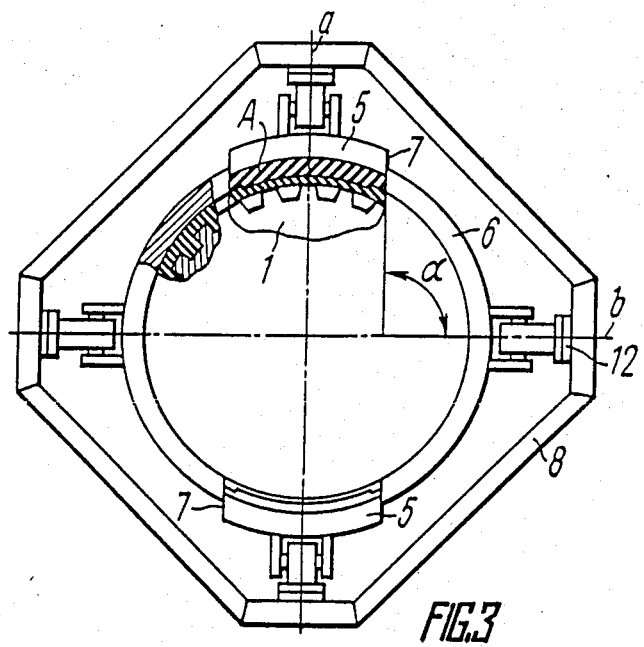
FIG. 3 is a top plan view of the mould for making polymeric articles according to the invention in the position for executing moulding.

The elements 6 move until they are brought in contact with the side surfaces 7 of the elements 5 to form a closed circuit, as seen best in FIG. 3.

Termination of the movement of the elements 6 is followed by displacement of the elements 5 acting to mould the second portions of the workpiece "A" until these elements 5 are brought in abutment with the flanges 3 of the core 1. Flow of the elastic material and rupture of the wear-resistant lining at the outside of the workpiece "A" are practically impossible due to the absence of a clearance between the side surfaces 7 of the elements 5 and 6.

After the workpiece has been moulded by the elements 6 and 5, it is subjected to vulcanization, normally by the heated plates of the press or in a furnace.

Pilot models of the proposed mould have been tested, and double-sided toothed belts with a wear-resistant tooth lining have been produced within one moulding procedure.

It is preferable to use the present invention for fabricating toothed belts.

The invention can be used most advantageously for making double-sided toothed belts.

We claim:

1. A mould for making annular polymeric articles comprising a cylindrical core (1) having a shaped surface mounted on a base and arranged to accommodate a workpiece (A) thereon, annular squeezing means (5, 6) for squeezing the workpiece arranged around the cylindrical core (1), means for moving said squeezing means radially to the formation of a closed circuit, and kinematic linkage for linking the means for moving with said squeezing means, said squeezing means comprising first and second elements (5, 6) arranged around the cylindrical core (1) for movement along directions which are orthogonal to each other, each first element (5) having side surfaces parallel with an axis (a) of symmetry of this element (5), whereas each second element (6) has side surfaces adjacent to the side surfaces of the neighboring first elements (5), the kinematic linkage linking the first and second elements (5 and 6) with the means for moving and being arranged to enable successive movement initially of all the second elements (6) radially inwardly and then all the first elements (5) radially inwardly by the moving means to form the closed circuit.

2. A mould as claimed in claim 1, wherein two first elements (5) and two second elements (6) are provided, the side surfaces of each second element resting at an angle of $\alpha=90°$ degrees to the axis (b) of symmetry thereof.

3. A mould for making annular polymeric articles comprising a cylindrical core (1) having a shaped surface mounted on a base and arranged to accommodate a workpiece (A) thereon, squeezing means (5, 6) for squeezing the workpiece arranged around the cylindrical core (1), means for moving said squeezing means radially to the formation of a closed circuit, and kinematic linkage for linking the means for moving with said squeezing means, said squeezing means comprising first and second elements (5, 6) arranged around the cylindrical core (1) alternately, each first element (5) having side surfaces parallel with an axis (a) of symmetry of this element (5), whereas each second element (6)

has side surfaces adjacent to the side surfaces of the neighboring first elements (5), the kinematic linkage linking the first and second elements (5 and 6) with the means for moving being arranged to enable successive movement initially of all the second elements (6) and then all the first elements (5), two first elements (5) and two second elements (6) being provided, the side surfaces of each second elements resting at an angle of $\alpha = 90°$ degrees to the axis (b) of symmetry thereof, the kinematic linkage for providing successive radial movements of the first and second elements (5 and 6) comprising a shell (8) arranged coaxially relative to the core (1), capable of axial displacement, and carrying on its inner side resiliently secured wedges (10, 10A), and arms (12, 12a) with pivot axes (11) secured on the base (4) and each engageable with the corresponding wedge (10, 10A) and element (5, 6) in the course of movement of the shell (8), the wedges (10) acting on the first elements (5) and wedges (10a) acting on the second elements (6) being secured on the shell (8) with a difference (H) in terms of the height of their arrangement.

4. A mould for making annular polymeric articles comprising a cylindrical core (1) having a shaped surface mounted on a base and arranged to accommodate a workpiece (A) thereon, squeezing means (5, 6) for squeezing the workpiece arranged around the cylindrical core (1), means for moving said squeezing means radially to the formation of a closed circuit, and kinematic linkage for linking the means for moving with said squeezing means, said squeezing means comprising first and second elements (5, 6) arranged around the cylindrical core (1) alternately, each first element (5) having side surfaces parallel with an axis (a) of symmetry of this element (5), whereas each second element (6) has side surfaces adjacent to the side surfaces of the neighboring first elements (5), the kinematic linkage linking the first and second elements (5 and 6) with the means for moving being arranged to enable successive movement initially of all the second elements (6) and then all the first elements (5), wherein the kinematic linkage for providing successive radial movements of the first and second elements (5 and 6) comprises a shell (8) arranged coaxially relative to the core (1), capable of axial displacement, and carrying on its inner side resiliently secured wedges (10, 10A), and arms (12, 12a) with pivot axes (11) secured on the base (4) and each engageable with the corresponding wedge (10, 10A) and element (5, 6) in the course of movement of the shell (8), the wedges (10) acting on the first elements (5) and wedges (10a) acting on the second elements (6) being secured on the shell (8) with a difference (H) in terms of the height of their arrangement.

* * * * *